United States Patent [19]

Blackaby

[11] 4,037,076

[45] July 19, 1977

[54] APPARATUS FOR BALANCING ROTATING BODIES

[75] Inventor: Benjamin E. Blackaby, Maumee, Ohio

[73] Assignee: Teledyne Industries, Inc., Los Angeles, Calif.

[21] Appl. No.: 642,155

[22] Filed: Dec. 18, 1975

[51] Int. Cl.² .............................................. B23K 26/00
[52] U.S. Cl. ................................................. 219/121 L
[58] Field of Search ..................... 219/121 L, 121 LM

[56] References Cited

U.S. PATENT DOCUMENTS

| | | | |
|---|---|---|---|
| 3,472,998 | 10/1969 | Popick et al. | 219/121 L |
| 3,482,075 | 12/1969 | Wilde | 219/121 L |
| 3,499,136 | 3/1970 | Nunnikhoven et al. | 219/121 LM |
| 3,538,298 | 11/1970 | Duston et al. | 219/121 LM |
| 3,594,532 | 7/1971 | Lunau et al. | 219/121 L |
| 3,621,180 | 11/1971 | Rolff | 219/121 L |
| 3,663,795 | 5/1972 | Myer | 219/121 L |
| 3,727,027 | 4/1973 | Kaiser et al. | 219/121 LM |
| 3,795,784 | 3/1974 | Moll et al. | 219/121 L |
| 3,865,564 | 2/1975 | Jaeger et al. | 219/121 L |
| 3,909,584 | 9/1975 | Brienza et al. | 219/121 LM |
| 3,942,878 | 3/1976 | Engel et al. | 219/121 L |

Primary Examiner—J. V. Truhe
Assistant Examiner—Clifford C. Shaw
Attorney, Agent, or Firm—Gifford, Chandler, Sheridan & Sprinkle

[57] ABSTRACT

Apparatus for balancing a rotating body in which the body is mounted for rotation and operatively coupled with a mechanism for rotating the body. Sensor means coupled to the rotating body transmit an unbalance signal in response to unbalance of the body to control means which compute the amount and location of compensating material required to be removed from the body in order to balance the body. Machining means for removing the computed amount of compensating material comprises a laser positioned to direct a laser beam at a rotating mirror synchronized to the rotational speed of the rotating body. An annular stationary reflector is positioned coaxially with the rotating mirror and is adapted to reflect the laser beam received from the rotating mirror to the rotating body thereby ablating the compensating material from the body. Indexing means coupled to the rotating mirror and operatively controlled by signals from the control means control the angular phase difference of the rotating mirror relative to the rotating body so that compensating material may be ablated by the laser beam at any angular position on the rotating body.

5 Claims, 2 Drawing Figures

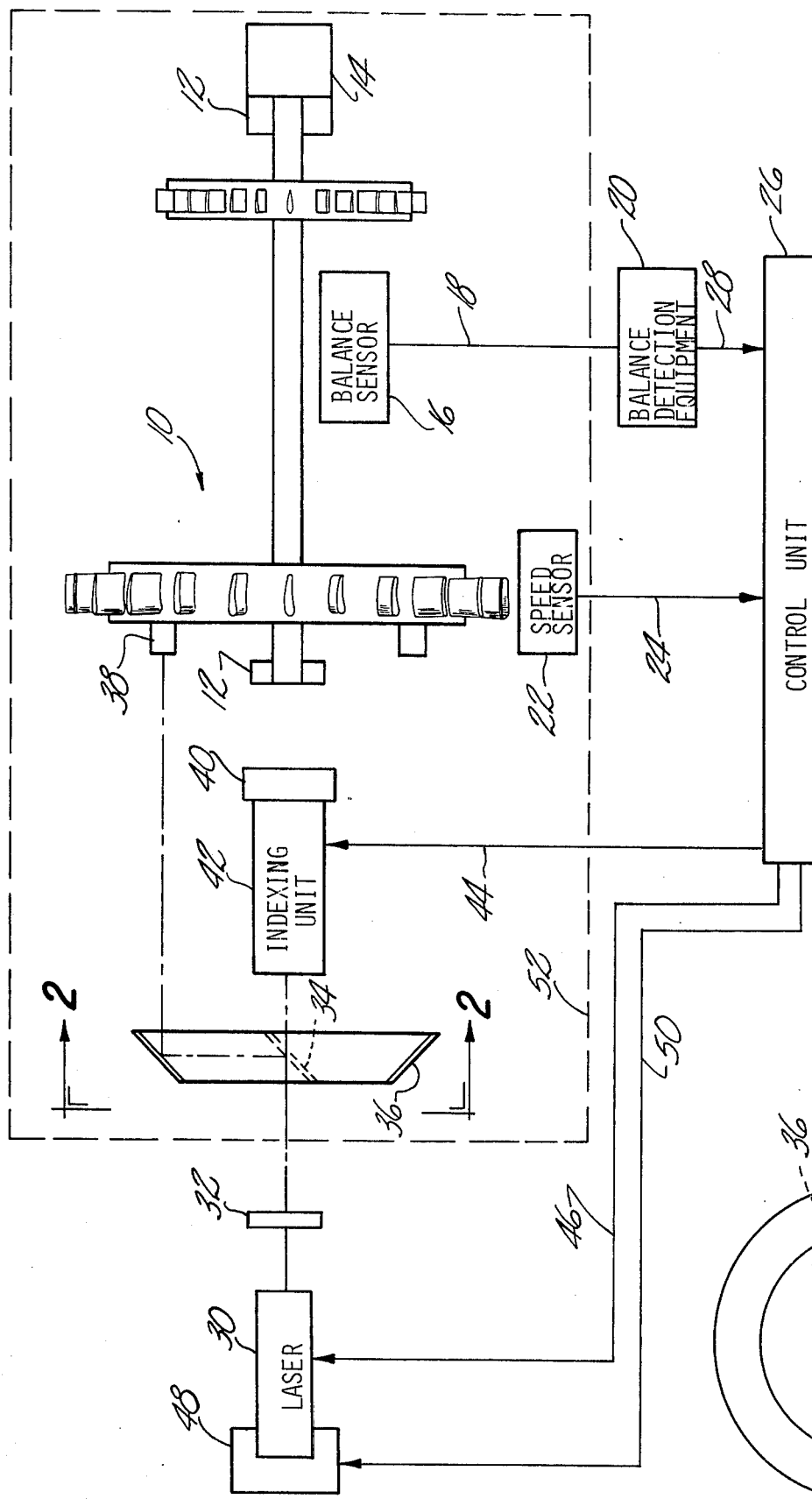

APPARATUS FOR BALANCING ROTATING BODIES

BACKGROUND OF THE INVENTION

I. Field of the Invention

The present invention relates generally to an apparatus for balancing a rotating body and, more particularly, to such an apparatus which utilizes a laser beam to ablate compensating material from the rotating body to achieve body balance.

II. Description of the Prior Art

High speed rotating bodies, such as turbine wheels, require balancing of the rotating body prior to its installation. For example, an unbalanced turbine wheel will result in bendng stress caused by the large rotational inertia force which not only subjects the bearings to excessive wear and tear, but also may result in turbine wheel failure.

Heretofore, high speed rotating bodies, such as turbine wheels, have been balanced at low speeds on semi-automated machinery. Balance sensors on the machinery sense the degree of unbalance of the turbine wheel, and computing means determine the amount and location of compensating material to be removed from the wheel in order to effect the proper wheel balance. Previously the compensating material has been removed manually, such as by a hand drill, and, for this reason, it is necessary to stop the rotation of the wheel prior to the removal of the compensating material. Hand removal of the compensating material is disadvantageous in that such removal is not only sensitive to operator technique but also unavoidable errors inherent in any manual operation result in not only the removal of an improper amount of compensating material but also removal from an incorrect location. Moreover in practice it has been found that low speed balancing of turbine wheels does not result in a sufficiently fine balancing to permit high speed operation of the rotating body.

In view of the difficulties and disadvantages in the hand removal of compensating material, it has been suggested that a high power laser be utilized to ablate compensating material from the rotating body. It has, for example, been previously suggested to actuate or fire a laser at a pre-chosen balance plane, such as a conventional balance ring, for a very short duration in order to remove compensating material from the rotating body.

In practice, however, this laser machining method has been found to be inadequate. One problem is that in order to remove compensating material from a given angular location on the turbine balance ring, the laser can be fired for a short duration only once per revolution of the rotating body in order to ablate the same location on the balance ring. Since the laser beam ablates only a relatively small amount of compensating material per turbine wheel revolution, such laser balancing systems have proven unduly time consuming in operation.

The previously known laser balancing systems suffer the further disadvantage in that as the rotational speed of the rotating body is increased to its expected operational speed, often times exceeding 18,000 RPM, the area of ablation by the laser becomes circumferentially oblong due to the high rotational speed of the body. While shorter laser pulses may reduce this circumferential oblongation, very short laser pulses are not only difficult to obtain with precision, but also such short pulses reduce the amount of compensating material ablated from the rotating body per laser pulse.

SUMMARY OF THE PRESENT INVENTION

The laser balancing apparatus of the present invention obviates the above mentioned disadvantages of the previously known laser machining methods by providing a rotating angled mirror coaxial with the rotating body and having its rotational speed synchronized to the rotational speed of the rotating body. A stationary annular reflector is provided coaxial with the rotating mirror so that a laser beam directed at the rotating mirror is reflected so the stationary reflector which in turn reflects the laser beam to a pre-chosen balance plane on the rotating body. An indexing unit is operatively connected to the rotating mirror so that the angular phase of the rotating mirror relative to the rotating body may be controllably varied In the preferred form of the invention, a control means receives input signals from conventional balance sensors, which detect unbalance of the rotating body and speed sensors, which detect the rotational speed of the body. The control means is pre-programmed to determine the amount and location of compensating material to be removed from the rotating body in order to effect a balanced condition of the rotating body. The control means then generates output signals to the indexing unit in order to position the angular phase of the rotating mirror relative to the rotating body, and second output means control the firing and duration of the laser pulse. The combination of the synchronized rotating mirror with the stationary annular reflector permits the laser beam to be continuously directed at the same location on the rotating body until the desired amount of compensating material is ablated. It is understood, of course, that it may be necessary to ablate compensating material from the rotating body at more than one location, and, for this reason, the control means is preferably of the closed loop type so that compensating material may be ablated from different locations by iteration until the desired rotating body balance is achieved. In this manner an important advantage of the present invention is realized in that the entire rotating body may be balanced without stopping the rotation of the body. Moreover, the present invention permits laser machining of the compensating material continuously, rather than by a single laser pulse per revolution, thereby greatly reducing the time required to balance the rotating body.

BRIEF DESCRIPTION OF THE DRAWINGS

The present invention will be more clearly understood by reference to the following detailed description when read in conjunction with the accompanying drawing, wherein like reference characters refer to like parts throughout the several views, and in which:

FIG. 1 is a block diagrammatic view showing the laser balancing system of the present invention; and FIG. 2 is a plan view taken substantially along line 2—2 in FIG. 1.

DETAILED DESCRIPTION

Referring to FIG. 1, a rotating body 10, illustrated as a turbine wheel, is shown rotatably mounted on means 12 such as conventional bearings. Rotating means 14 are operatively coupled with the rotating body 10 and function to rotate the body 10 at the given desired rotational speed. The means 14 may be mechanically linked by a belt, chain, or the like to the body 10 or may, as in the case of a turbine wheel produce an air flow for rotating the body 10. In any event, the rotating means 14 may be of conventional construction.

A conventional balance sensor 16 is positioned adjacent the rotating body 10 and functions to generate an unbalance signal along line 18 to conventional balance detection equipment 20. As should be apparent, the balance sensor 16 detects unbalance in the body 10 as it rotates. A speed sensor 22 likewise is operatively coupled with the rotating body 10 and generates a signal along line 24 indicative of the rotational speed of the body 10.

A control unit 26 is provided and receives as its input a signal from the speed sensor 22 along line 24 and a signal from the balance detection equipment 20 along a line 28. The control unit 26 is pre-programmed and determines the amount and location of compensating material to be removed from the body 10 necessary to correct unbalance of the body 10. The output signals from the control unit 26 will hereinafter be described in greater detail.

The laser 30 is provided in the present invention for removing compensating material from the rotating body 10 by ablation. Preferably the laser 30 is coaxial with the rotating body 10 and directs its laser beam through a lens mechanism 32, if required, to a flat angled rotating mirror 34 coaxial with the body 10. As best shown in FIG. 2, an annular reflector 36 is positioned coaxial with the rotating mirror 34 and both the mirror 34 and the reflector 36 are constructed so that a laser beam directed at the rotating mirror 34 will be reflected to the stationary annular reflector 36 and thereafter directed to a pre-chosen balance plane on the rotating body 10, such as a balancing ring 38 (FIG. 1). It is apparent from the foregoing that as the mirror 34 rotates, the rotating mirror 34 will reflect the laser beam to different circumferential positions around the annular reflector 36.

Synchronizing means 40 are provided to synchronize the rotational speed of the rotating mirror 34 with the speed of the rotating body 10. The synchronizing means 40 may, of course, comprise a direct mechanical connection between the body 10 and the rotating mirror 34, or other more elaborate synchronizing means 40 may be utilized. An indexing unit 42, such as a stepper or synchronous motor, is coupled between the synchronizing means 40 and the rotating mirror 34 so that upon actuation of the indexing unit 42 by the control unit 26 via line 44, the angular phase of the mirror 34 may be controllably varied with reference to the rotating body 10. In this manner actuation of the indexing unit 42 merely varies the angular phase of the mirror 34 relative to the body 10 without hindering the synchronous rotation of the mirror 34 and body 10.

The component parts of the present invention having been described, the operation is as follows: The body 10 is first mounted on the mounting means 12 and the rotating means 14 are actuated thereby rotating the body 10 at the desired speed. The balance sensor 16 and speed sensor 22 provide information to the pre-programmed control unit 26 which computes the location and amount of compensating material required to be removed from the ring 38 carried by the body 10 in order to effect body balance. The proper location for the removal of the compensating material having been determined, the indexing unit 42 is actuated by the control unit 26 via line 44 until the required angular phase difference between the rotating mirror 34 and a reference point on the body 10 is achieved. The indexing unit 42 is then deactivated so that the aforementioned angular phase difference is maintained while the synchronizing unit 40 maintains synchronous speed operation between the mirror 34 and body 10. The control unit 26 then activates the laser 30 via line 46 so that the laser beam is reflected from the mirror 34 to the annular reflector 36 and onto the balancing ring 38 of the body 10 to ablate compensating material therefrom. It will be understood, of course, that the duration of the laser beam is controlled by the control unit 26 in accordance with the desired amount of compensating material to be removed.

In the preferred form of the invention the control means 26 functions as a closed loop system by iteration so that actuation of the laser 30, and the angular position of the indexing unit 42 will vary continuously with the changing signals received from the balance sensor 16 until the proper balance is achieved.

It can thus be seen that the present invention provides substantial advantages over the previously known laser balancing mechanisms for rotating bodies. More specifically the present invention provides a much more rapid balancing of the body 10 since compensating material may be continuously ablated from the balancing ring 38 in contrast to the previously known method of a single, short laser pulse per body revolution. Moreover, since the combination of the rotating mirror 34 and the stationary reflector 36 permits the laser beam to be continuously pin-pointed on the balancing ring 38 at any required location, the previously known circumferential oblongation of the ablation is totally eliminated.

Improvements to the present invention will become apparent to those skilled in the art. For example, a positioning means 48 may be associated with the laser 30 so that upon actuation by the control unit 26 along a line 50, the laser 30 may be laterally moved. Such lateral movement of the laser 30 will, of course, slightly vary the point of incidence of the laser beam upon the balancing ring 38 of the body 10. Such a result may be desirable, for example, when a relatively large area of ablation is required.

A further improvement to the present invention may comprise the provision of a vacuum enclosure 52 surrounding the rotating body 10 so that the body 10 rotates in or near vacuum. Air resistance is therefore eliminated by the vacuum enclosure 52 so that the rotating body 10 may be rotated at very high speeds without large power input from the rotating means 14. The provision of a vacuum enclosure has been heretofore impractical when the compensating material is hand removed since such an enclosure would necessarily undergo multiple and time consuming depressurizations.

Further improvements will become apparent upon a reading of this specification by those skilled in the art to which it pertains without deviation from the spirit of the invention as defined by the scope of the appended claims.

I claim:

1. Apparatus for balancing a rotating body comprising:
   means for rotatably mounting said body,
   means for rotating said body,
   means for detecting unbalance of said body and for generating an unbalance signal in response thereto, control means for computing the amount and location of compensating material to be removed from said body in response to said unbalance signal in order to balance said body, and machining means for removing said amount of compensating material at said location, said machining means further comprising an angled mirror and means for rotating the mirror coaxially with the rotating body, a laser positioned to direct a laser beam axially toward the rotating mirror whereby the mirror reflects the laser beam radially outwardly from the rotational axis of the mirror, means for synchronizing the rotational speed of said mirror to the rotational speed of said body, a stationary annular reflector disposed radially outwardly from and coaxially with said mirror, whereby said mirror reflects said laser beam to said reflector which in turn reflects said laser beam axially toward said rotating body so that said laser beam impinges substantially perpendicularly on said rotating body to thereby remove said compensating material therefrom.

2. The apparatus as defined in claim 1 and including indexing means responsive to said control means for controllably varying the angular phase of said rotating mirror relative to said rotating body.

3. The apparatus as defined in claim 1 wherein said rotating body is a turbine wheel.

4. The apparatus as defined in claim 1 wherein said rotating mirror is a flat angled mirror having its plane angled with respect to the axis of rotation of said mirror.

5. The apparatus as defined in claim 1 wherein said rotating body is rotated in a low pressure chamber.

* * * * *